April 11, 1967  O. F. MARVIN  3,313,601
RECOVERY OF METAL VALUES FROM OXYGENATED ORES
Filed Oct. 14, 1963
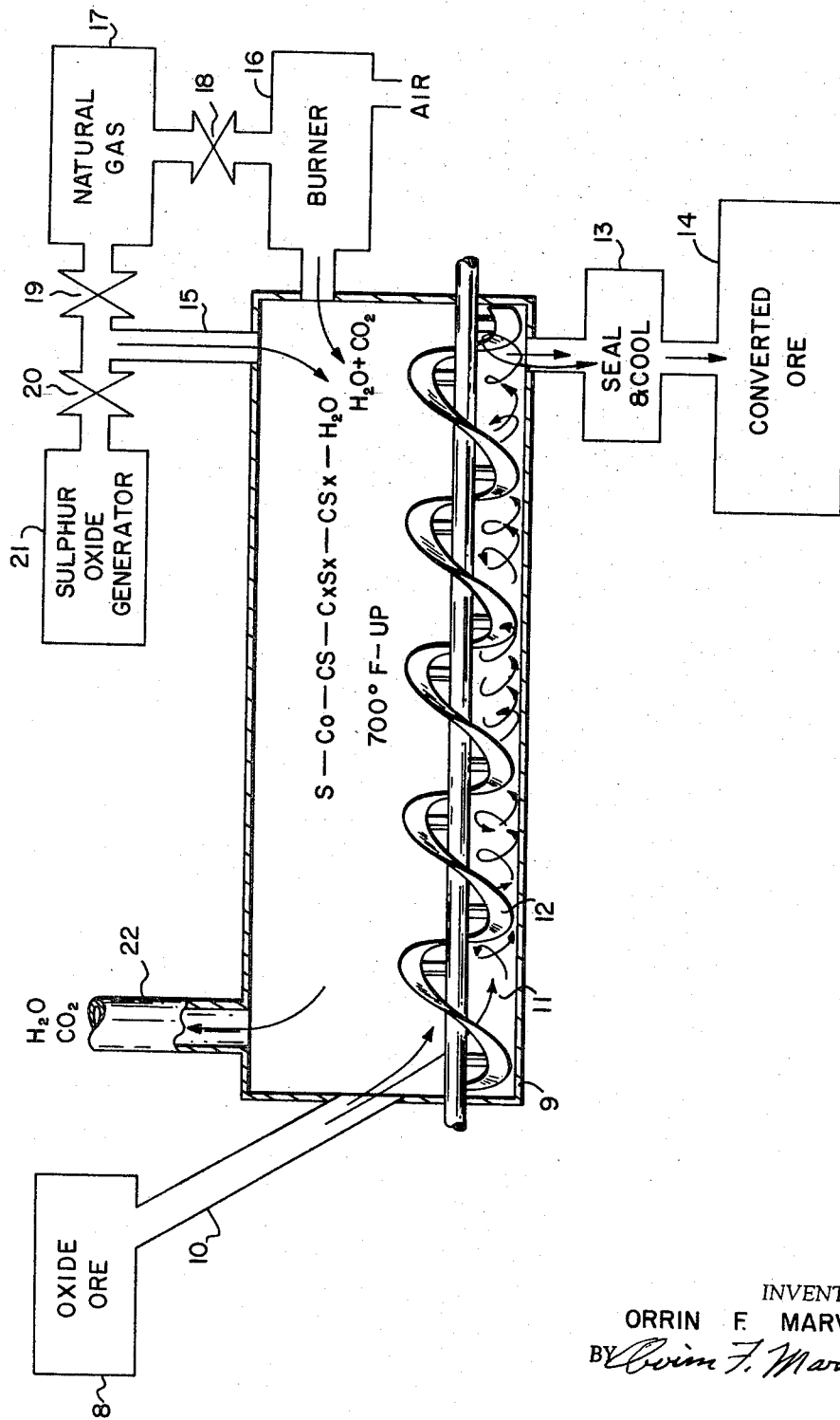
INVENTOR.
ORRIN F. MARVIN

United States Patent Office 3,313,601
Patented Apr. 11, 1967

3,313,601
RECOVERY OF METAL VALUES FROM
OXYGENATED ORES
Orrin F. Marvin, 1549 W. Madison,
Phoenix, Ariz. 85007
Filed Oct. 14, 1963, Ser. No. 316,030
9 Claims. (Cl. 23—319)

My invention relates in general to the recovery of metal values from ores usually referred to as oxide ores. It relates more particularly to the conversion of oxygenated minerals to sulphides and to a means of selectively sulphidizing the oxides of the various elements. The various elements which respond to my present invention are as follows; copper, lead, zinc, cadmium, antimony, tin, bismuth, nickel, cobalt, manganese, iron, uranium, titanium, tantalum, columbium, silver, gallium, germanium, indium, platinum group metals, molybdenum, chromium, and vanadium. It also relates to new recovery methods as heretofore unknown by means of which the oxygenated minerals of the ores may become available for treatment by substantially any known chemical and/or metallurgical method to obtain better recoveries of the total metal values at a substantially lower cost.

Many deposits of oxide ore, dumps, waste, overburden, slag piles, and tailings are known which cannot be economically treated by present day metallurgy, although they contain considerable metal values.

The principal object of my present invention is the provision of/and means for treating oxygenated ores and/or slags and other waste material.

Another principal object of my present invention is the provision of/and means for the production of carbon sulphide gas (CS).

Another principal object of my present invention is the provision of/and means for recovering elemental sulphur from sulphur oxide gases such as smelter smokes.

Another principal object is the production of solid carbon monosulphide (CS) from sulphur oxides.

Another object is to treat an oxide ore in such a manner so that subsequently the ore may be treated in accordance with any known chemical and metallurgical process.

Another object is to recover all of the metal values from oxide ores including substantially all precious metals and rare metals present.

Another object is to recover all the metal values from oxide ores by a physical-chemical mechanism which permits production of a concentrate of the ore as one step in its treatment.

Another object is the provision of means for the direct recovery of metals without the interposition of a smelter procedure now commonly used in most metal recovery methods.

Another object is the provision of means for the direct recovery of metal values without the interposition of refineries now commonly used in most metal recovery methods.

A further object is to concomitantly secure substantially all of the metal values from oxygenated ores and reduce both the processing costs and capital inventment cost normally associated with such recoveries.

Another object is to recover all the sulphur of the sulphides formed by the present invention and use this sulphur in a cyclic manner for creating new sulphides from oxygenated minerals.

Another object is provision of means for selectively creating sulphides from oxides.

Another object is provision of means for changing non-magnetic iron to magnetic iron.

Another object is provision of means for converting oxides of iron to sulphides of iron.

Another object is the provision of/and means for concentrating specific metal concentrates from oxide ores without leaving appreciable metal values in tailings.

Another object is the provision of means for treating multiple or complex oxides in such a manner as to break the complex so that the ore may then be treated in accordance with any one of many different chemical and metallurgical processes.

Other specific objects and features of the invention will be apparent from the following detailed description taken with the accompanying drawing herein.

The figure is a schematic view showing the significant step in the process of the present invention wherein the oxide ore is subjected to a relatively low temperature in an atmosphere created by a mixture of natural gas and sulphur oxides in such a manner so that the oxygenated minerals are changed to sulphides and the iron to the magnetic state, and make the ore available for subsequent processing in accordance with substantially any chemical and/or metallurgical procedure, or combination thereof for the recovery of substantially all of the metal values, including values of precious metals and rare metals.

Example 2 shows a treatment of an oxide ore containing iron, copper, zinc, lead, gold and silver for the recovery of the metal values therefrom.

Example 3 is another example showing a manner in which an oxide ore containing iron, manganese, nickel, tin, copper and zinc as carbonates, oxides and silicates can be treated, in accordance with the present invention, for the recovery of all the metal values therefrom.

Example 4 is an other example showing the treatment of an oxide ore comprising iron and titanium along with the usual gangue material, in accordance with the present invention, for recovery of substantially all the metal values therefrom.

Example 5 shows the significant steps of the present invention wherein the sulphur of the sulphides formed by the present invention is used in a cyclic manner to form new sulphides.

Example 6 shows the alternate steps in the present invention wherein the iron oxide is converted to magnetic iron in one instance and to sulphide in the other.

Example 7 illustrates the treatment of an oxide ore comprising iron and chromium, such as the mineral chromite, in accordance with the present invention for the recovery of all the metal values therefrom.

Example 8 shows the treatment of an oxide ore comprising iron, manganese, tantalum and columbium, in accordance with the present invention, for the recovery of all of the metal values therefrom.

Example 9 is the treatment of an oxide ore comprising iron, manganese and tungsten, such as the mineral wolframite, in accordance with the present invention, for the separation of all the metal values therefrom.

Example 10 shows the treatment of an oxide ore comprising iron as ferric iron or non-magnetic iron, in accordance with the present invention, for the conversion of the non-magnetic iron to magnetic iron and the recovery of substantially all of the iron in a very highly concentrated form.

Example 11 shows the treatment of an oxide ore comprising nickel, cobalt and arsenic, such as the minerals erythrite and annabergite, in accordance with the present invention, for the separation of nickel and cobalt from the arsenic and the recovery of the nickel and cobalt therefrom.

Example 12 shows the treatment of an oxide ore containing uranium and vanadium, in accordance with my present invention, for the recovery of the uranium and vanadium in a highly pure state.

Example 13 shows the treatment of slag, in accordance with my present invention, for the recovery of the metal values therefrom.

Example 14 shows the treatment of ores containing gallium, germanium, lead, zinc, iron, gold and silver, in accordance with my present invention, for the metal values therefrom.

Example 15 shows the treatment of an ore containing both sulphide and oxide of copper, in accordance with my present invention, wherein the complex copper-iron sulphide and the oxide copper contained is converted to chalcocite ($Cu_2S$), and the iron converted from sulphide to oxide.

Example 16 shows a means, in accordance with my present invention, of treating the complex mineral pentlandite ($NiFeS_2$) and simultaneously upgrading the nickel sulphide by changing pentlandite to hazelwoodite ($Ni_3S_2$) and ferrous oxide (FeO).

Example 17 shows the treatment of sulphur oxide gases such as smelter smokes, in accordance with my present invention, for the recovery of the sulphur as elemental sulphur.

Example 18 shows the treatment of an oxide ore containing molybdenum oxide, in accordance with my present invention, for the recovery of molybdenum in a highly pure state.

Example 19 shows a treatment of an oxide ore containing vanadium and selenium, in accordance with my present invention, wherein the vanadium oxide is converted to vanadium sulphide and the selenium is recovered as a concentrate by sublimation.

In accordance with the general features of my invention I have treated many ores commonly called overburden or waste and complex solid solution minerals. I may treat substantially any fraction of these ores, in accordance with my invention, and beneficially recover metal values which are not now normally recovered in commercial practice. I can treat ores containing manganese which are too low grade and contain many impurities, making them unsuitable for blast furnace feed or any other known treatment. I can recover the manganese as a very high grade concentrate or as substantially pure metal or compounds of manganese and at the same time profitably recover the other metal values.

As a further illustration, I can treat ores containing copper, iron, gold, silver and the usual gangue materials. Many of these ores are at present catalogued as overburden and are presently being removed from the unoxidized lower ores (sulphides) and in many instances dumped as waste. In accordance with my present invention I can economically recover substantially all the metal values from most of these ores.

As another illustration, I can treat ores generally referred to as ilmenite in accordance with my present invention and beneficially recover the titanium, iron, tin and other metal values therefrom.

As a further illustration, I can treat ores usually referred to as taconite, limonite, goethite, hematite and many other oxide iron ores all of which are non-magnetic. In accordance with my present invention I can convert the iron to magnetic iron, which can then be very highly concentrated more economically than by any other known metallurgical method.

In accordance with the general features of my invention, I first prepare the ore to be treated by crushing and/or grinding to size or mesh best suited to the particular ore and I heat the oxide ore at a temperature between about 700° F. upward; in some cases even to fusion depending upon the metal values which I desire to convert to sulphides.

Before referring more in detail to the perimeters of my conversion procedure, the schematic illustration of equipment and method shown in the figure will first be discussed. The temperature and atmosphere must be adjusted to suit the particular ore being treated. As an example, when treating an oxide ore containing copper and chromium, I prefer to first heat the ore to 800° F. in the presence of a gas produced by heating sulphur oxides and natural gas together, forming a mixture of carbon sulphides, keeping as near as is practical a stoichiometric balance between the sulphur oxides and a reducing gas. The end product obtained under these conditions would consist of the copper in the form of a sulphide and the chromium remaining as the oxide. After removing the copper sulphide by flotation or other means, I then treat the residue containing the chromium at 1600° F. in the presence of these carbon sulphide gases, using a slight excess of hydrocarbon gas. The converted product from this step contains all of the chromium as chromium sulphide. This product then can be treated by flotation to recover the chromium.

In the figure, I show a convertor 9 which for all practical purposes is sealed except for passageways to be described for the admission of gases thereto, the removal of gases, and introduction of the ore to be converted. The ore is delivered from a bin 8 suitably sealed to prevent entrance of air through a conveyor 10 which delivers the ore in a continuously controlled quantity stream. In the drawing 10 is shown merely as a chute, it being understood that any one of several different types of feed mechanism such as a screw conveyor may be employed.

The ore is delivered to the bed 11 and is then continuously and slowly advanced along the bed by a screw or ribbon conveyor 12, so that as the ore is advanced it is also turned over and fresh surfaces continuously presented into contact with this carbon sulphide atmosphere which consists principally of carbon monosulphide. The converted ore is discharged at the right hand side of the convertor, looking at the figure, through a cooling and sealing chamber 13 and hence to a sealed receiving bin 14, the converted ore thereby being kept out of contact with atmospheric air while it is in a heated condition.

Sulphur oxides and hydrocarbon gas are introduced through metered valves 19 and 20 being conducted through duct 15 into the convertor. Metered valves 19 and 20 being adjusted to suit the particular ore being treated.

The hot gases from the convertor are discharged through stack 22 which runs to any suitable location as is determined by an overall design. This gas consists of carbon dioxide and water vapor.

The convertor may be directly heated by burner 16, adjusting said burner so as to produce a neutral flame or slightly reducing flame, however, the reactor can be heated by indirect heat.

The temperatures and broadly indicated atmospheric conditions will vary over a wide range depending upon what metal values I desire to convert to sulphides. This will be borne out later by details of specific examples.

(Throughout the specifications the applicant will use the combining weight proportions of sulphur dioxide and hydrocarbon gases. The term natural gas used hereinafter in the specifications consists of a combination of methane, ethane, propane and butane. The natural gas from one area may be substantially methane with small amounts of the other gases mentioned, whereas at another locality the natural gas would contain more ethane than methane along with propane and butane.)

If, for example, I am treating an oxidized copper ore and wish only to form the sulphides of copper and silver without forming a sulphide of the iron, I would use a temperature of about 1300° F. in an atmosphere created by heating a mixture of sulphur oxide and a hydrocarbon gas maintaining a stoichiometric balance between the above-mentioned gases or a slight excess of sulphur oxide gas. By control of the atmosphere as above stated, the end results will leave the iron still in the oxide form, but the non-magnetic iron oxides will be converted to magnetic oxides. The copper oxides, including silicates, chlorides, carbonates, phosphates or any other oxygenated copper compound will be converted to a synthetic chalcocite ($Cu_2S$). The silver, whether it be present as chloride, iodide, or basic sulphate, will be converted to silver sulphide (Ag$_2$S). After this conversion step the ore is in an ideal condition for concentrating the copper, gold and silver by flotation. The iron can be concentrated very efficiently and to a very high grade iron concentrate by magnetic separation. If the ore contains zinc in the oxidized form it can be left unchanged by controlling the time of the reaction. However, if it is desired to recover the zinc by selective flotation, then the zinc also can be converted to zinc sulphide by allowing more time for the conversion period.

If I desire to form sulphides of the copper, zinc, and iron, I would then use a temperature of about 1300° F. up and an excess of hydrocarbon gas with or without the addition of a solid hydrocarbon or carbon. The resulting sulphides formed under these conditions would be as follows: copper as chalcopyrite with possibly some chalcocite, the zinc as a synthetic sphalerite or marmatite, the iron would be largely converted to pyrrhotite, and the silver would be converted to synthetic argentite.

As another illustration showing the selectivity of converting the different elements, when I treat an oxygenated ore containing nickel, cobalt and chromium, and I wish to selectively convert these oxidized elements to sulphides, I would first use a temperature of about 1000° F. using a stoichiometric balance of sulphur oxide and hydrocarbon gas which would convert only the nickel and cobalt to sulphides. After removing the nickel and cobalt sulphides by flotation or other means, I then would convert the chromium to chromium sulphide by using a temperature of 1400° F. up and using an excess of hydrocarbon gas with or without the addition of a solid hydrocarbon or carbon. This same general procedure could be used when tantalum and columbium were present in place of or in conjunction with chromium. The addition of a solid hydrocarbon or carbon as mentioned hereinabove is not in most cases necessary in order to carry out this reaction. The sole function for this addition of hydrocarbon or carbon is to speed the reaction, thereby increasing the capacity of any given convertor, when using the same flow of sulphur oxide and hydrocarbon gas through the convertor. By using a solid hydrocarbon, particularly in a finely divided condition and along with sulphur oxide it is possible to eliminate entirely the use of hydrocarbon gas. However, the use of hydrocarbon gas with sulphur oxide has proven to be advantageous over the use of solid hydrocarbons, particularly where it is advantageous to acquire a quantitative use of the sulphur oxide.

*Example 1*

As an illustration showing the utility of my present invention, directed specifically to the physical change which takes place in the conversion of oxygenated minerals to sulphide minerals, and particularly to the growth of the crystals of sulphide. I used for example, a piece of oxidized copper ore having the approximated dimensions of ½ inch thick by 2 inches long, consisting of the minerals malachite, azurite, and chrysocolla, containing approximately 5% copper, I heated this in an atmosphere of sulphur oxide and hydrocarbon gas to a temperature of 1000° F. and held at this temperature for a period of 20 minutes, then quickly cooled in a sealed chamber. I found on inspection a growth of crystals of synthetic chalcocite on the surface of this irregular piece of converted ore, of an average 1/32 of an inch in length, extending approximately straight out from the mother rock. They were hair like or elongated prisms with knee like joints, and consisting of chemically pure cuprous sulphide. The reaction from oxide to sulphide penetrated to a depth of approximately ⅛ inch during this period. I have not had the time to establish just how far this crystal growth can be advanced, but one would naturally assume that where sufficient copper were available and given sufficient time and contact, there may be no limit to this crystal growth. As an example, assuming that a given grade of oxidized copper ore was converted to sulphide copper, and again assuming, that to this product was added more oxide copper and then put through my conversion step, the crystals of sulphide copper, which were formed in the first converted product would be added to the copper sulphide formed by the added converted oxide, this should, to some degree at least, increase in size the original copper sulphide crystals. There are many cases where natural oxidation of primary minerals have extended to a point where the metal values are so finely disseminated throughout the ore that they are indistinguishable by microscopic examination, when this condition exists it has been found that the recovery of the metal values by concentration is next to impossible. By my new process it is practical to treat this type of ore and in so treating, increase the crystal size of the metal values so that they are amenable to concentration.

*Example 2*

As a further illustration, I selected an oxygenated ore containing copper 8½%, zinc 5%, lead 1.3%, iron 12.2%, and $16.00 per ton gold and silver. This ore I crushed and ground to ⅛ inch mesh. I then heated the ore to 1300° F. in the presence of carbon sulphide gas, produced by heating together sulphur dioxide and natural gas in proportions of 4¼ parts of sulphur dioxide to 1 part of natural gas. The heating was continued for a period of 15 minutes, then the material was cooled to room temperature out of contact with air. The converted material was examined and I found that all of the copper, zinc, lead and silver was in the form of sulphides. The iron was in the form of a mixture of highly magnetic ferrous and ferric oxides. The copper sulphide was substantially all cuprous sulphide (Cu$_2$S). The lead was in the form of synthetic galena, the zinc as synthetic sphalerite, and the silver and gold was substantially all tied with the lead sulphide. This of course, can be selectively floated to obtain copper concentrates, zinc concentrates, and lead, gold and silver concentrates.

*Example 3*

The United States, at present, is importing substantially all the manganese ores utilized in the production of alloys, manganese compounds, etc. Although there are many known large deposits of manganese in the United States, most of which are too complex or low grade and not amenable to efficient concentration, making it economically impractical to produce the desired grade of manganese concenerate suitable for present day needs.

A deposit in the State of Arizona, has been developed by core drilling and surveying. The summary of this development work shows an approximate 12,000,000 tons of ore containing on an average of 12.75% manganese, about 15% iron, about 1.25% calcium carbonate and calcium sulphate, .06% zinc, .04% tin, and 1.1% chromium. As an illustrative example showing the recovery of manganese from low grade and complex manganese ores by my present invention, a sample was obtained from this deposit, and after grinding to 20 mesh, I treated this ore at a temperature of 1350° F. in an atmosphere created by heating natural gas and sulphur oxide together, for a period of 30 minutes and then quickly cooled this converted material out of contact with air to room temperature. This converted material containing the manganese, zinc, and tin as sulphide, then was ground to −80 mesh and floated at a pH of 9 with xanthate and a frother, this produced a bulk sulphide float of the manganese, zinc and tin. This bulk flotation concentrate was then reground to approximately 100 mesh and refloated in a cleaner circuit which eliminated substantially all of the iron, calcium, and gangue material from the bulk concentrate. The tailings from this cleaner concentrate was returned to the primary circuit. The cleaned concentrates mentioned above assayed 55% manganese. A portion of this concentrate was calcined by an oxidizing roast at approximately 800° F. and then assayed 64.5% manganese. Another portion of this concentrate was leached with sodium sulphide and sodium hydroxide, and the residue washed.

This residue was substantially free of tin. Another portion of the abovementioned concentrate was leached with 10% sulphuric acid solution, using just a sufficient amount of this dilute sulphuric acid, so that at the end of the leach the acidity remained at a pH of 4. The residue from this leach, after being washed, was substantially free of manganese and the manganese solution contained only traces of other elements.

Example 4

To the best of my knowledge, the ores of titanium being processed today for the production of titanium and its compounds are of necessity simple ores of titanium, such as rutile, brookite, and anatase, which are free of impurities found in other ores containing titanium. There are many deposits containing titanium, wherein the titanium is in solid solution with iron and manganese, such as the minerals generally referred to as ilmenite and wad. There are tremendous alluvial deposits known as "black sands," many of which contain appreciable amounts of these solid solution titanium compounds. From such a material I made a concentrate by magnetic means, and the strongly magnetic fraction was ground to —65 mesh, then mixed with a solid hydrocarbon. This mixture was then heated to 1550° F. in an atmosphere created by heating sulphur oxide and a hydrocarbon gas, using an excess of hydrocarbon gas over and above the stoichiometric amount necessary to combine with the sulphur oxides,

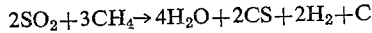
$$2SO_2 + 3CH_4 \rightarrow 4H_2O + 2CS + 2H_2 + C$$

for a period of 45 minutes while being stirred and moved through the reaction zone, and discharged into a sealed water cooled conveyor, and cooled in this conveyor to approximately room temperature before being discharged. This converted product, consisting of titanium sulphide with some iron sulphide and the balance of the iron as magnetic oxide, was then subjected to froth flotation, conducted in such a manner as to float all of the sulphides. The flotation concentrate was then leached with 15% solution of sulphuric acid at 175° F. for one hour, then filtered and washed. The washed residue was substantially free of iron and manganese, and assayed 95% titanium sulphide.

Example 5

As an illustration showing the use of the sulphur in a sulphide in a cyclic manner, I selected a zinc carbonate ore and treated this ore by heating it in an atmosphere of carbon sulphide gas, produced by heating together sulphur dioxide and natural gas in proportions of 4¼ parts of sulphur dioxide to 1 part of natural gas, at a temperature of 1350° F. for a period of 15 minutes. The gas discharged from the above reaction, during this 15-minute period, consisted substantially of water vapor and carbon dioxide. This material was then cooled to room temperature out of contact with air. The cooled material was then ground to free the zinc sulphide produced by the above reaction and then subjected to froth flotation. The flotation product was filtered and dried, then roasted in the presence of air to produce sulphur dioxide, which was used for producing new carbon sulphide gas, for converting more oxidized zinc to zinc sulphide.

Example 6

As a further illustration showing the selectivity of forming sulphides of the metal values in ores, I selected an iron ore consisting largely of ferric oxide. This ore was crushed and ground to —30 mesh, then heated to 1450° F. in the presence of a gas produced by heating a mixture of sulphur dioxide and natural gas, in proportions of 1 part of sulphur dioxide to 1 part of natural gas, for a period of 30 minutes, then cooled out of contact with air to room temperature. All the iron in the resulting product was in the form of ferrous sulphides (FeS).

Example 7

As a further illustration I used a sample of chromite concentrate ($FeCr_2O_4$) ground to —80 mesh. I heated this sample at a temperature of 1600° F. in the presence of carbon sulphide gas for a period of 60 minutes, then cooled this out of contact with air. This converted product consisted of chromium sulphide (CrS) and iron as ferrous sulphide and ferrous oxide. This was then leached with dilute sulphuric acid at approximately 80° F. for one hour. The solution contained substantially all of the iron and a minute portion of the chromium. The insoluble residue remaining, after leaching with dilute sulphuric acid and washing, contained substantially all of the chromium as chromium sulphide.

Example 8

To further illustrate the degree of temperature necessary to convert the various metal value oxides to sulphides, a concentrate of tantalite, which consists of tantalum, columbium, iron and manganese as complex oxides was used. I heated this material to 1850° F. in the presence of carbon sulphide gas for a period of 1 hour, then cooled out of contact with air to approximately room temperature. The tantalum, columbium and manganese in this converted material were present as sulphides, the iron as a mono-sulphide. This converted product was then leached with dilute sulphuric acid at approximately 80° F., adding the dilute sulphuric acid slowly until the pH of the solution remained at 5. The time consumed in this leach was approximately 4 minutes. This leaching also liberated considerable hydrogen sulphide gas. This was then filtered and the residue washed. The residue contained all of the tantalum and columbium and most of the iron. The solution contained substantially all of the manganese with a trace of iron. The above washed residue was again leached with dilute sulphuric acid at about 200° F. for 30 minutes, then filtered and washed. The insoluble residue contained all of the tantalum and columbium as sulphides and was substantially free of iron and manganese.

Example 9

For another illustration of selective conversion of oxides to sulphides and the subsequent selective leaching to accomplish the separation and concentration of the metal values, I treated a sample of wolframite, containing iron, manganese and tungsten as complex oxides, by heating at a temperature of 1700° F. for a period of one hour, in an atmosphere created by mixing sulphur oxide gas and hydrocarbon gas, using an excess of hydrocarbon gas. Then cooled out of contact with air to approximately room temperature. This converted product contained all the iron, manganese and tungsten as sulphides. The converted product was then leached with dilute sulphuric acid at approximately 80° F., adding the dilute sulphuric acid slowly until the pH of the solution remained at 5. The time consumed in this leach was approximately 4 minutes. This leaching also liberated considerable hydrogen sulphide gas. This was then filtered and the residue washed. The residue contained all of the tungsten as tungsten sulphide and substantially all of the iron as iron sulphide. The solution contained substantially all of the manganese with a trace of iron. The above washed residue was again leached with dilute sulphuric acid at about 200° F. for 30 minutes, then filtered and washed. This insoluble residue contained all of the tungsten as tungsten sulphide and was substantially free of iron and manganese.

Example 10

A further illustration of the conversion of non-magnetic iron to magnetic or paramagnetic iron, I treated an ore of hematite, a non-magnetic ferric oxide of iron, by heating at a temperature of 800° F. in the presence of carbon sulphide gas, for a period of 15 minutes. This converted material was examined and found to be extremely paramagnetic. The material, after the conversion, can be removed to the air immediately after conversion or cooled out of contact with air. In either case, the iron product is paramagnetic after conversion.

Example 11

As a further illustration, in practicing my invention, I selected a literitic residual ore containing nickel, cobalt, arsenic, gold and silver. There are many such deposits in the Southwestern part of the United States, that have in the past defied economic recovery of these metal values. I have treated several of these ores with good results. This particular ore was identified as annabergite (a hydrous arsenate of nickel), having the following analysis; 2.7% nickel, .1% cobalt, 12.7% iron, 40% magnesium oxide, gold and silver $4.50 per ton. The nickel and cobalt were in the form of arsenates, and the iron was substantially all limonite (non-magnetic). This ore I treated at a temperature of 1200° F. in the presence of a carbon sulphide gas, for 35 minutes, while being slowly stirred and moved through the conversion zone, then cooled in a water cooled sealed conveyor to approximately room temperature. This converted product consisted of nickel sulphide, cobalt sulphide, silver sulphide, elemental gold and the iron as paramagnetic iron oxide. The magnesium and silicon apparently remained unchanged. The arsenic was substantially all removed by sublimation. This converted product was then treated by standard flotation for the nickel, cobalt, gold and silver recovery. The concentrate assayed 22% nickel, .7% cobalt, gold and silver $25.20 per ton of concentrate.

Example 12

As another example showing the scope of my present invention, I treated a caronotite ore, which is a hydrous potassium uranium vanadate, by heating at a temperature of 1400° F. for a period of 45 minutes, in the presence of carbon sulphide gas, then cooled out of contact with air. The converted product contained the uranium and vanadium in the form of sulphides. This product was further ground to −150 mesh and subjected to froth flotation at a pH of 7. The flotation concentrate contained substantially all of the uranium and vanadium. This flotation concentrate was then leached with an aqueous solution of sodium sulphide and sodium hydroxide for ½ hour at room temperature. It was then filtered and washed and the insoluble residue from the above leach was substantially free of vanadium, and was found to assay 42% uranium.

Example 13

There are in the United States and other parts of the world, many billion tons of slag which are residues left after smelting. In Arizona there is a slag pile consisting of some thirty-five million tons. A sample was taken from this slag pile and an analysis showed it to contain .6% copper, 2.6% zinc, 2% antimony, 33% iron, 4.7% calcium oxide, 2.7% magnesium oxide, 7.8% aluminum oxide, and 36% silicon dioxide, the precious metal values consisting of gold and silver amounted to $1.65 per ton. This sample was ground to −30 mesh, then treated by my present invention, by heating to 1300° F. in the presence of carbon sulphide gas, for a period of 40 minutes, then cooled out of contact with air to room temperature. An examination of this converted product showed the copper, zinc, antimony and silver to be in a form of sulphides. This converted product was then ground in the presence of suitable flotation reagents to −200 mesh, then floated for a bulk concentrate. This bulk concentrate had the following analysis; 12% copper, 32% zinc, gold and silver $18.00 per ton. The tailings had a total metal value of copper, zinc, gold and silver of 87¢ per ton. Next this bulk concentrate was treated by selective flotation to float the copper and depress the zinc. The floated product from this operation had the following analysis; 33.4% copper, 4.3% zinc, gold and silver $16.20 per ton. This selective float was then treated by leaching with an alkaline metal hydroxide, which solubilized substantially all of the antimony. This antimony solution was treated by an electrolytic reduction for the recovery of metallic antimony. The residue, after the abovementioned leach, contained 56% copper. Going back to the residue remaining after the bulk flotation which contained most of the iron, this residue was treated by wet magnetic separation, and the magnetic concentrate produced therefrom contained 62% iron. This grade of iron is very suitable for blast furnace feed after pelletizing.

Example 14

As a further illustration showing the utility of my invention I selected an ore containing .7% germanium, .02% gallium, 4% lead, 15% zinc, and 18% iron. I heated this ore to a temperature of 1400° F. for a period of 90 minutes, in the presence of carbon sulphide gas, then cooled out of contact with air. The exhaust gases from the conversion chamber were allowed to pass into a cooled condenser during this 90-minute interval. Substantially all of the gallium and germanium were sublimed as sulphides, and were caught in the above mentioned condenser. The remaining residue contained the lead and zinc as sulphides and was subjected to selective flotation.

Example 15

Substantially all base metal ore deposits contain both sulphide and oxide of the metal values, and in nearly all cases the oxide portion of the metal values is either discarded as waste or treated for their recovery by chemical means after the removal of the sulphide portion by concentration such as flotation. The recovery of the oxide portion, when it is practiced, is invariably very costly. Also, in many cases the sulphide portion of the metal values are complexed with other elements, as for example, copper and iron sulphides (chalcopyrite). As a case in point, to further illustrate the flexibility and economics of my present invention, I selected a copper ore containing 5% copper, and 12% iron. Approximately 60% of the copper content was in the form of carbonates, oxide, and silicate. The remaining portion of the copper contained, was in the form of approximately 85% chalcopyrite and 15% chalcocite. This ore I heated to a temperature of 1000° F. for a period of 30 minutes, in the presence of a mixture of sulphur oxide and natural gas, in proportions of 85% sulphur oxide and 15% natural gas. The converted material was then cooled out of contact with air. This converted product was examined and it was found that substantially all the copper contained in the original ore had been converted to chalcocite ($Cu_2S$). All the iron was converted to ferrous oxide of iron. This converted material was then subjected to froth flotation without the use of any collector whatsoever. I used just sufficient pine oil to establish a proper froth. The flotation concentrate assayed; 62% copper and contained 98.3% of the copper in the original sample.

Example 16

In order to further illustrate the breaking of complexes and the concentration of the metal values by the interreaction between complex sulphides and oxides when practicing my present invention, I selected a concentrate of nickel-iron sulphide (pentlandite), to which I added a nickel oxide and thoroughly mixed. I then heated this mixture at a temperature of 1200° F. for a period of 45 minutes in the presence of a mixture of sulphur oxide and natural gas, in proportions of 85% sulphur oxide and 15% natural gas. The converted material was then cooled out of contact with air to room temperature. This converted product was examined and it was found that substantially all the nickel contained was in the form of nickel sub-sulphide ($Ni_3S_2$). The iron was in the form of ferrous oxide.

Example 17

To illustrate still another phase of my present invention, I heated a mixture of sulphur dioxide and natural gas, in proportions as shown by the following equation $(2SO_2+CH_4 \rightarrow 2H_2O+CO_2+2S)$ to 800° F. The exhaust gases from the heated reaction chamber were introduced into a cooled condenser. The condensate in the above-mentioned condenser was substantially pure elemental sulphur. The gas discharged from the outlet of this condenser consisted of carbon oxides and water vapor. This part of my present invention can be used for the economical recovery of sulphur from industrial wastes, such as smelter fumes. Thereby, eliminating a health hazard to animal and plant life, and at the same time stop a terrific waste of sulphur.

Example 18

A secondary ore of molybdenum, containing .6% molybdenum as molybdenum oxide, was ground to —30 mesh. I heated this ore at a temperature of 1350° F. in an atmosphere of carbon sulphide gas for a period of 30 minutes, then cooled out of contact with air to approximately room temperature. This converted ore was then subjected to flotation without the use of a collector. No reagents with the exception of a frother was used in this flotation operation. The floated concentrate product contained 89% of the molybdenum originally present in the ore, and assayed 45% molybdenum.

Example 19

There are many deposits, particularly alluvial and sedimentary, containing vanadium oxide and selenium. A sample of such an ore was ground to —30 mesh. I heated this ore at a temperature of 1200° F., using a condenser in series with the reaction chamber. The selenium was sublimed as a mixture of selenium and selenium sulphide, and was collected in the condenser. The remaining portion of the converted ore was subjected to froth flotation, using only a small amount of pine oil and no other reagents. A flotation concentrate was obtained assaying 36% vanadium.

When I refer to oxide ores, I do not necessarily mean that all the metal values are in the oxidized state. There can be sulphides, arsenides, chlorides, selemides, tellurides or metal, mixed with the oxygenated metal values.

If there are no oxides present in the ore, the oxide necessary to complete the reaction can be added in the form of an oxide ore, or a relatively pure oxide, sulphate, or other oxygenated compounds of the metal which I wish to recover.

Laterites and gossans, are residual deposits from which at least part of the primary metal values have been leached by nature. These ores tend to be near amorphous, or the metal values are very small crystals disseminated throughout the ore. If the metal value oxide is very fine and sparingly distributed in the ore, the sulphide crystal formed by my present invention will also be small; so small in some cases that flotation is either very slow or recoveries so low as to be prohibitive. When this condition exists I mix with the ore a small amount of dilute acid such as sulphuric, or a small amount of alkali salt such as sodium chloride, before converting the oxide to sulphide. This procedure promotes coalescence of the sulphide formed.

Another method which has proved advantageous, is to mix the ore with varying amounts of oxygenated compound of the metal I wish to recover, such as mixing nickel sulphate or nickel oxide, with an ore of nickel. This also promotes coalescence, and allows for very efficient flotation.

The various time intervals referred to in the foregoing specifications is not necessarily the minimum time required to complete the reactions. In many of these examples I used a batch process, wherein the ore was as much as 3 inches deep and was not disturbed by stirring or other means. This shows that the converting gas permeates the rock and bed of material very rapidly and there is a strong attraction for this gas by most oxygenated minerals. Given time this converting gas will completely permeate large pieces of ore.

Due to the conversion of oxides to sulphides and the removal of water of crystallization, by my present invention, an ore becomes much more friable, therefore the subsequent grinding cost is substantially reduced.

The cyclic use of sulphur of the sulphides formed, by my present invention, by roasting the concentrate produced from the converted ores, to produce sulphur oxide for converting the new ore, substantially eliminates what is generally referred to as chemical cost. The fuel and hydrocarbon gas are for all practical purposes the only factors involved in the direct cost of conversion. For example the cost of natural gas to heat one ton of oxide copper ore, containing 1% copper and 5% iron, to 800° F., plus the natural gas for combining with the sulphur oxide, should not exceed 15¢, when natural gas is 30¢ per thousand cu. ft.

Sulphidizing of minerals by the prior art has been accomplished with some minerals but in all cases the cost has been excessively high and the recovery and grade of concentrate low.

The use of carboxylic acid, sulfhydryl and cationic collectors have been used with very limited success.

Since oxygen minerals do not differ enough among each other to provide for the maximum opportunity for flotation separation, the converting of these minerals to true sulphides by my present invention, automatically increases the economic mineral wealth of the world.

The following equation will further illustrate the various atmospheres which can be obtained by adjustment of the relative proportions of sulphur oxide gas to hydrocarbon gas:

$$SO_2+CH_4 \rightarrow 2H_2O+CS$$

I prefer to use the above proportions when I am converting oxide ores of copper, silver, lead, zinc, cadmium, antimony, bismuth, tin, nickel, cobalt, manganese, vanadium, molybdenum, uranium, indium, gallium and germanium to sulphides. To accomplish selective conversion I prefer to use temperature and time control, however, selectivity can be controlled by the use of the following reaction, and in some cases a combination of these variables is appropriate.

$$2SO_2+CH_4 \rightarrow 2H_2O+CO_2+2S$$

I use the above proportions when I am recovering elemental sulphur from sulphur oxide gases, such as smelter smoke, however, I do not limit myself solely to sulphur recovery, as conversion of some of the oxides to sulphides can be accomplished. Also some selectivity is practical. The next following proportion shows still another atmosphere:

$$3SO_2+CH_4 \rightarrow 2H_2O+CO_2+2SO+S$$

For conversion of titanium, columbium, tantalum, tungsten, chromium and iron oxides to sulphides, I prefer to use the following proportion.

$$2SO_2+3CH_4 \rightarrow 4H_2O+2CS+2H_2+C$$

The immediately above proportions can be used for converting all the elements previously mentioned in the specifications.

All of the reactions mentioned in the above specifications were performed at atmospheric pressure and the maximum temperature used was 1850° F.

In the near future I intend to examine the possibilities of pressures other than atmospheric and higher temperatures, particularly in regard to beryllium ores.

There are so many different kinds of ore wherein are found almost any combination of mixture of the elements, therefor, it would be extremely difficult and time consuming to attempt to show all the possible combinations and their treatment, by my present invention. Those skilled in the art should encounter no difficulty in practicing my invention after a thorough study of the specifications as set forth herein.

Terms in the specifications and in the claims are, in general, used in their usual sense in the art unless the context indicates to the contrary.

Finally, although I have explained and illustrated my invention in detail so that those skilled in the art will understand the manner of practicing the same, the scope of the invention is defined by the claims.

I claim:

1. A method of treating oxide ores containing oxides of metals selected from the group consisting of copper, lead, zinc, cadmium, antimony, tin, bismuth, nickel, cobalt, manganese, silver, germanium, indium, molybdenum, vanadium, gallium, iron, uranium, titanium, tantalum, columbium and chromium to convert said oxides to sulphides which comprises: heating said oxide ores in an atmosphere of a mixture of natural gas and sulphur dioxide in proportion to their combining weights of a low limit of 3 parts sulphur dioxide to 1 part natural gas to a high limit of 2 parts sulphur dioxide to 3 parts natural gas at a temperature of from 800° F. to 1850° F. at about atmospheric pressure.

2. A method of treating oxide ores containing oxides of metals selected from the group consisting of copper, lead, zinc, cadmium, antimony, tin, bismuth, nickel, cobalt, manganese, silver, germanium, indium, molybdenum, vanadium, gallium, iron, uranium, titanium, tantalum, columbium and chromium to convert said oxides to sulphides which comprises: heating said oxide ores in an atmosphere created by heating a mixture of natural gas and sulphur dioxide in proportion to their combining weights of a low limit of 3 parts sulphur dioxide to 1 part natural gas to a high limit of 2 parts sulphur dioxide to 3 parts natural gas at a temperature of from 800° F. to 1850° F. at about atmospheric pressure.

3. A method of treating oxide ores containing oxides of metals selected from the group consisting of copper, lead, zinc, cadmium, antimony, tin, bismuth, nickel, cobalt, manganese, silver, germanium, indium, molybdenum, vanadium, gallium, iron, uranium, titanium, tantalum, columbium and chromium to convert said oxides to sulphides which comprises: heating said oxide ores in an atmosphere of carbon monosulphide produced by heating a mixture of natural gas and sulphur dioxide in proportion to their combining weights of a low limit of 1 part sulphur dioxide to 1 part natural gas to a high limit of 2 parts sulphur dioxide to 3 parts natural gas at a temperature of from 800° F. to 1850° F. at about atmospheric pressure.

4. A method of treating the solid solution complex oxide mineral tantalite which consists of tantalum, columbium, manganese and iron to convert said oxides to sulphides which comprises: heating said oxides in an atmosphere created by heating a mixture of natural gas and sulphur dioxide in proportion to their combining weights of 2 parts sulphur dioxide to 3 parts natural gas at a temperature of about 1850° F. at atmospheric pressure.

5. A method of treating oxide ores containing oxides of metals selected from the group consisting of copper, zinc, lead and silver to convert said oxides to sulphides which comprises: heating said oxide ore in an atmosphere created by mixing natural gas with sulphur dioxide in proportion to their combining weights of 1 part sulphur dioxide to 1 part natural gas at a temperature between 800° F. to 1300° F. at atmospheric pressure.

6. A method of treating oxide ores containing oxides of metals selected from the group consisting of antimony, tin, bismuth, germanium and molybdenum to convert said oxides to sulphides which comprises: heating said oxide ores in an atmosphere created by heating a mixture of natural gas and sulphur dioxide in proportion to their combining weights of 1 part sulphur dioxide to 1 part natural gas at a temperature between 1200° F. to 1400° F. at atmospheric pressure.

7. A method of treating oxide ores containing oxides of metals selected from the group consisting of titanium, uranium, tungsten and chromium to convert said oxides to sulphides which comprises: heating said oxide ores in an atmosphere created by heating a mixture of natural gas and sulphur dioxide in proportion to their combining weights of 2 parts sulphur dioxide to 3 parts natural gas at a temperature at about 1700° F. at atmospheric pressure.

8. A method of treating oxide ores containing oxides of metals selected from the group consisting of cadmium, antimony, tin, bismuth, nickel, cobalt, manganese, indium, silver and germanium to convert said oxides to sulphides which comprises: heating said oxide ores in an atmosphere of carbon monosulphide at a temperature of from 1000° F. to 1400° F. at about atmospheric pressure.

9. A method of treating oxide ores containing oxides of metals selected from the group consisting of uranium, titanium, tantalum, columbium and chromium to convert said oxides to sulphides which comprises: heating said oxide ores in an atmosphere consisting of carbon monosulphide, hydrogen and carbon at a temperature from 1700° F. to 1850° F. at about atmospheric pressure.

References Cited by the Examiner
UNITED STATES PATENTS

| | | | |
|---|---|---|---|
| 1,178,191 | 4/1916 | Sulman | 23—134 |
| 1,252,024 | 1/1918 | Petinot | 23—134 |
| 2,102,081 | 12/1937 | Lepsoe | 23—226 |
| 2,316,201 | 4/1943 | Walldin | 23—226 |
| 2,536,680 | 1/1951 | Folkins | 23—206 |
| 2,661,267 | 12/1953 | Folkins | 23—206 |

OTHER REFERENCES

Mellor: Comprehensive Treatise on Inorganic & Theoretical Chemistry, vol. 6, pp. 96 and 114.

CARL D. QUARFORTH, *Primary Examiner.*

BENJAMIN R. PADGETT, L. DEWAYNE RUTLEDGE, *Examiners.*

S. TRAUB, *Assistant Examiner.*